United States Patent

[11] 3,586,038

| [72] | Inventor | George W. Jahrstorfer<br>Wapping, Conn. |
|---|---|---|
| [21] | Appl. No. | 865,364 |
| [22] | Filed | Oct. 10, 1969 |
| [45] | Patented | June 22, 1971 |
| [73] | Assignee | Chandler Evans Inc.<br>West Hartford, Conn. |

[54] Y CHECK VALVE
1 Claim, 4 Drawing Figs.

[52] U.S. Cl. ................................................. 137/512,
137/527.4
[51] Int. Cl. ..................................................... F16k 15/03
[50] Field of Search ........................................... 137/512,
527, 512.1

[56] References Cited
UNITED STATES PATENTS

| 181,940 | 9/1876 | Hovey | 137/512 |
|---|---|---|---|
| 734,978 | 7/1903 | Simpson | 137/512 |
| 2,201,711 | 5/1940 | Boosey | 137/512 |
| 2,312,290 | 2/1943 | Smith | 137/527.4 |
| 2,877,792 | 3/1959 | Tybus | 137/512.1 |
| 3,072,141 | 1/1963 | Wheeler | 137/527.4 |

*Primary Examiner*—Laverne D. Geiger
*Assistant Examiner*—William H. Wright
*Attorney*—Radford W. Luther ABSTRACT: A pneumatic check valve assembly having a housing with an outlet and two converging inlets. Two pivotally mounted valve flapper assemblies are movable through respective arcs which define acute angles. Two valve seats are respectively formed on the peripheral interiors of the inlets and a fixed bracket is mounted within the housing in alignment with the outlet. The valve flappers are pivoted on the bracket and abut an extension on the bracket during normal flow through the inlets to the outlet, but seat against their respective seats during reverse flow in the outlet.

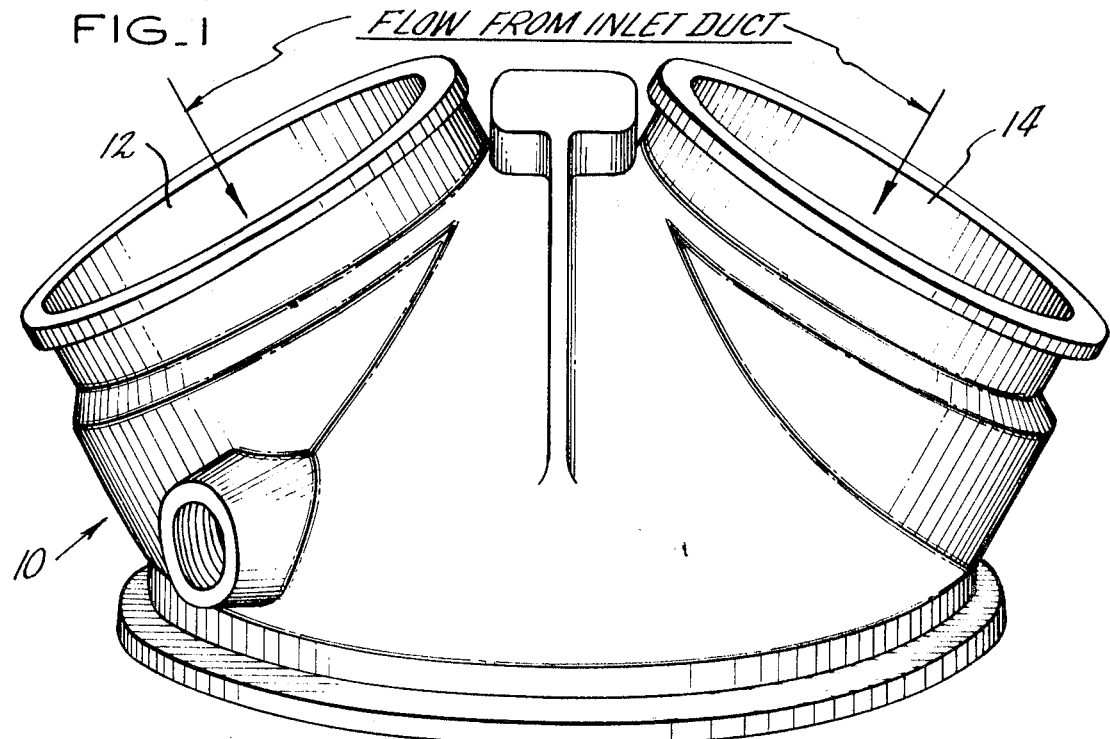
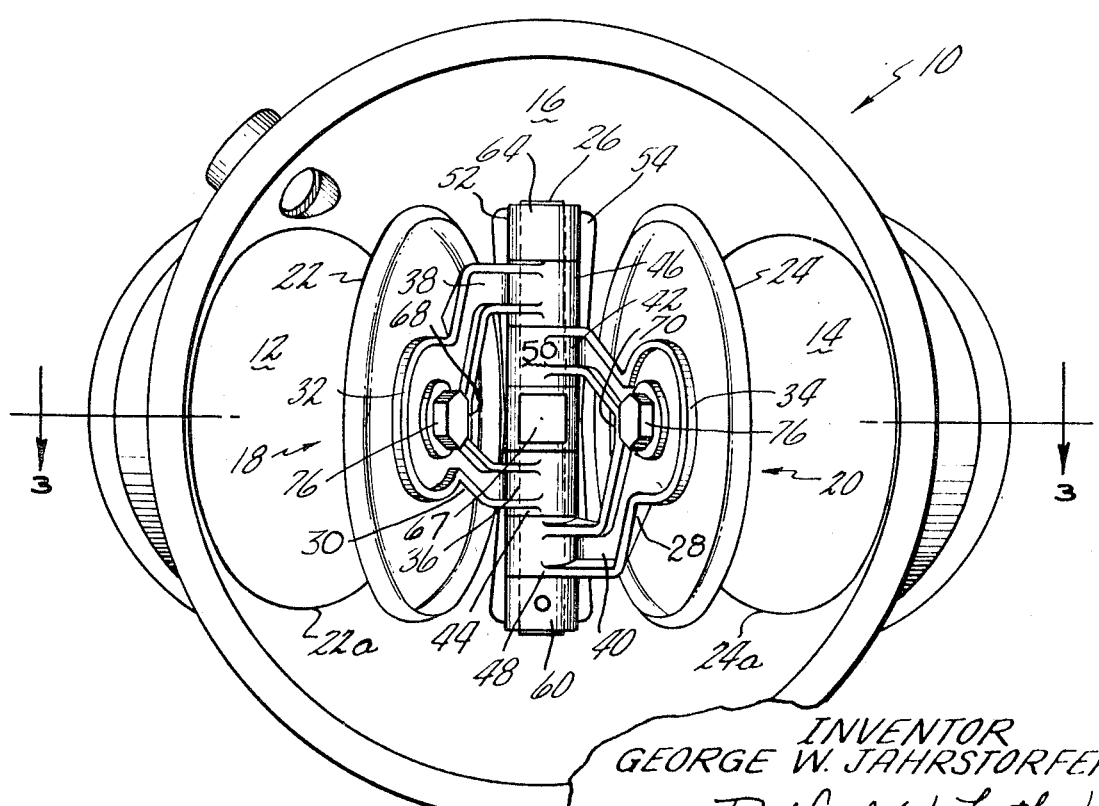

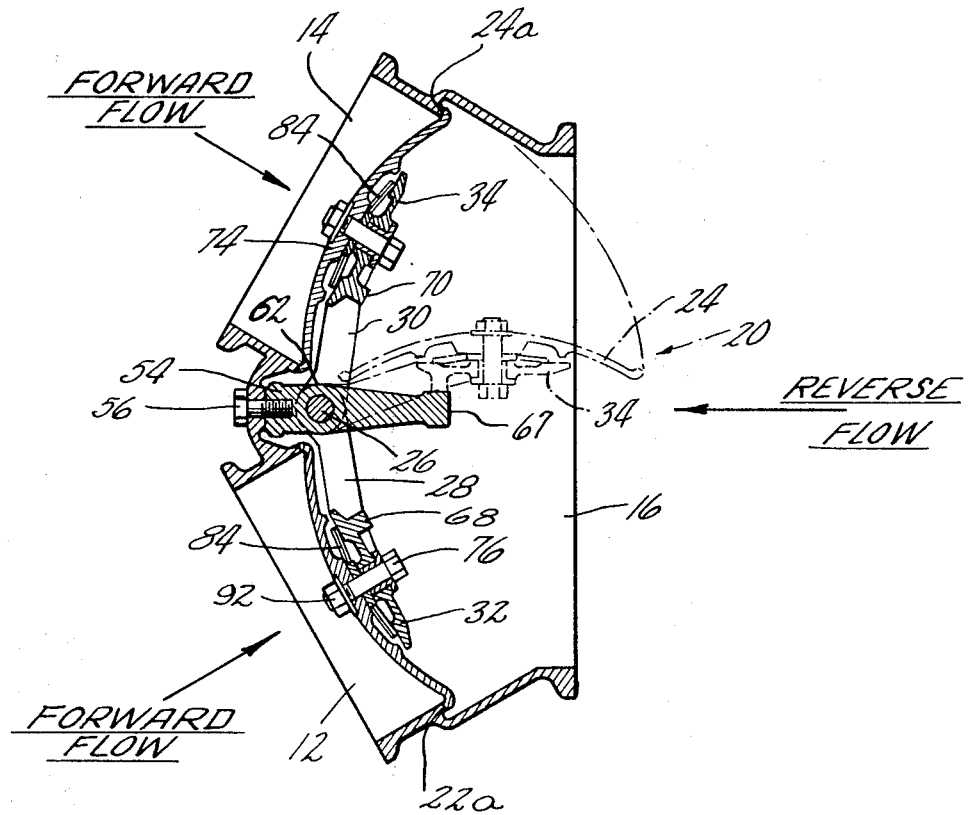
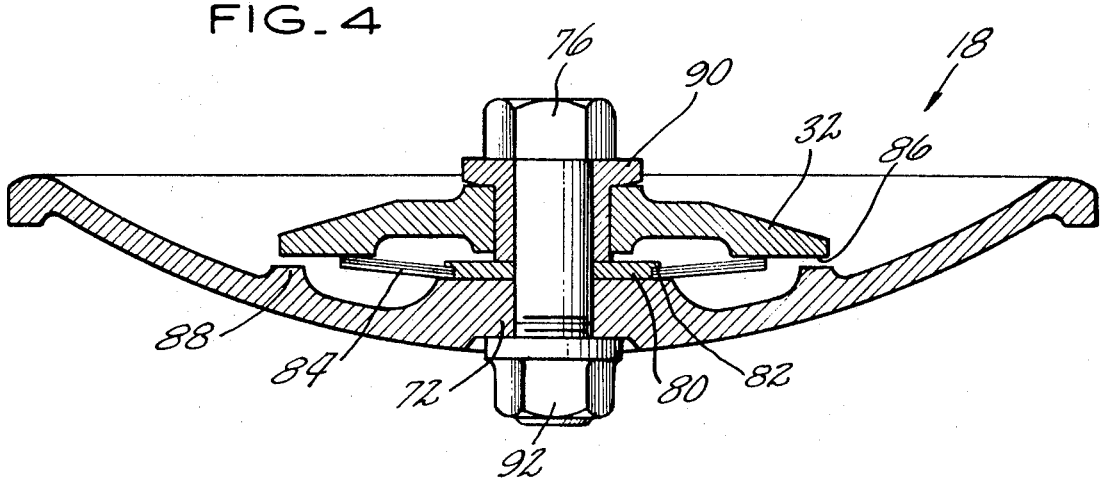

Y CHECK VALVE

BACKGROUND OF THE INVENTION

This invention pertains to check valves and more particularly to duct interconnections which include a check valve.

There are situations where it is necessary to mix a flow from two or more ducts and direct the mixture to an outlet duct while insuring that a reverse flow in the outlet duct is checked. An example of such a situation is an outlet duct which receives flow from a high-pressure bleed in the compressor of a gas turbine and also receives a flow from two ducts which communicate with respective lower pressure bleeds in the compressor. When flow is wholly derived from the two inlet ducts, the high-pressure bleed not communicating with the outlet duct, no problem is encountered but, as soon as flow from the high-pressure bleed is communicated to the outlet duct a check means is required to block a return flow through the inlet ducts to the low-pressure bleeds.

Conventional solutions to the above problems are to provide two check valves in respective locations in the inlet ducts or to provide a single check valve in the outlet duct situated intermediate a point of joinder of the inlet ducts and the point at which the outlet duct communicates with the high-pressure bleed.

An objectionable characteristic inherent in both the above approaches is that a "Y" connection must be incorporated to Attempts the two inlet and outlet ducts while flanging must also be provided for the installation of the check valve or valves. Thus to implement the above solutions it is necessary to install one or two check valves in the ducting and connect the ducts by a Y-connection. Cost considerations and/or weight limitations may render the above approaches infeasible in certain applications, such as aircraft pressurization systems. Also, if spring loaded check valves are utilized a detrimental pressure drop thereacross may result.

SUMMARY OF THE INVENTION

A housing includes an outlet and two smaller converging inlets, the inlets being provided with valve flappers. The flappers are freely pivoted to cause a minimal pressure drop and mounted for limited angular rotation to minimize slamming impact between the flappers and valve seats produced by a reverse flow in the outlet. This impact might otherwise be injurious to the flappers and seats. The housing is adapted to be connected between two inlet ducts and an outlet duct.

The invention provides a novel means of connecting two or more inlet ducts and at least one outlet duct where a reverse flow in the inlet ducts is not permitted. As the check valve structure is in the housing which joins the three ducts a substantial weight saving is possible over an arrangement which includes not only a housing for joining the ducts but also check valve or valves positioned in the outlet duct or inlet ducts. The housing of the invention also reduces construction and material costs since only a single duct connecting means is required to join the ducts and check a return flow.

Accordingly, it is a primary object of the invention to provide a light weight duct interconnecting housing which includes check valves therein and uses the aerodynamic pressure forces associated with reverse flow to provide checking action thus rendering inclusion of closure springs unnecessary.

Another object is to provide a relatively simple check valve structure having at least two inlets and at least one outlet wherein the inlets are respectively associated with freely pivoted valve flappers.

Yet another object is to provide a housing with flapper valves incorporated therein wherein the angular rotation of the flapper valves is limited to an acute angle to increase the service life of the valve flappers and valve seats by minimizing the slamming impact therebetween.

Still further objects and advantages will appear in the detailed description set forth below, it being understood, however, that this detailed description is given by way of illustration and explanation only and not by way of limitation, since various changes therein may be made by those skilled in the art without departing from the scope or spirit of the present invention.

BRIEF DESCRIPTION OF THE DRAWINGS

FIG. 1 is an exterior plan view of a check valve according to the invention.

FIG. 2 is a rear elevational view of the check valve of FIG. 1 to illustrate the interior construction thereof.

FIG. 3 is a plan longitudinal sectional view, taken substantially along the line 3–3 in FIG. 2.

FIG. 4 is an enlargement of a flapper assembly of FIG. 3.

DETAILED DESCRIPTION OF PREFERRED EMBODIMENT

Turning now to FIG. 1 there is shown a check valve, generally indicated at 10, having a curvilinear housing which comprises two converging inlet passages 12 and 14 and a larger outlet passage 16. Inlets 12 and 14 are adapted to be respectively connected to inlet ducts (not shown) which in turn communicate with low-pressure bleeds (not shown) in the compressor section of a gas turbine engine. Outlet 16 is adapted to be attached to an outlet duct (not shown) having a downstream portion thereof communicating with a high-pressure compressor bleed via a shutoff valve.

FIG. 2 shows an interior view of the housing 10 and illustrates the manner of installation of the flapper valve assemblies generally designated at 18 and 20. Valve discs 22 and 24 are freely pivoted on a pilot rod 26 by means of pilot arms 28 and 30 which are secured to the respective discs and pivotally mounted on pilot rod 26. Pilot arms 28 and 30 comprise circular portions 32 and 34 which are integral with branches 36, 38 and 40, 42 respectively. The extremities 44, 46, 48, and 50 of the respective branches 36, 38, 40 and 42 have bores passing therethrough, which are adapted to receive pilot rod 26. Pilot rod mounting bracket 52 has a mounting plate 54 which is bolted to housing 10 by bolt 56. Bracket 52 has three vertically spaced cylindrical elements 60, 62, and 64 thereon which also have bores passing therethrough which embrace pilot rod 26 so as to fixedly position the same. In order to prevent wear cylindrical bushings (not shown) are positioned between the interior surfaces of the bores of the extremities and pilot rod 26.

The cylindrical element 62 has an integral horizontal extension 67 projecting therefrom which serves to limit rearward rotational movement of pilot arms 32 and 34 by contacting integral abutments 68 and 70 formed on pilot arms 28 and 30 respectively. The mounting bracket then functions as a receptacle for pilot rod 26 and as rearward limit stop for the pilot arms 28 and 30.

Referring now to FIGS. 3 and 4 where the structure and arrangement of the flapper valve assemblies 18 and 20 is more clearly shown, it can be seen that valve discs 22 and 24 are in abutting contact with annular valve seats 22a and 24a respectively, the seats being formed at the ends of inlets adjacent to the interior periphery of the inlets 12 and 14. Valve discs 22 and 24 have centrally disposed bosses 72 and 74 through which bolts 76 are passed to secure the pilot arms to their respective valve discs.

The details of the attachment between the valve flapper discs and the pilot arms will be described with reference to assembly 18 as both assemblies are identical. FIG. 4 shows a washer 80 with a peripheral channel 82 disposed thereon mounted contiguous with the face of boss 72. Three stacked spring washers 84 are generally concentric with washer 80 and lie partially within channel 82. The outer circumference of the upper spring washer bears against annular surface 86 of circular portion 32. The function of these spring washers is to allow the valve disc 22 to firmly establish sealing contact with seat 22a by providing angular alignment freedom. An intermediate circumferential ridge 88 has a planar surface which is parallel to surface 86 and spaced therefrom. A cylindrical flanged bushing 90 surrounds bolt 76 and is urged into compressed contact with washer 80 by a nut 92 (FIG. 3). The ridge 88, washer 80, and flanged bushing 90 cooperate to delimit the axial sliding movement relative to the disc, of circular portion 32, which slides on flanged bushing 90. When the flapper assembly 18 is not subjected to external loads spring washers 84 tend to urge circular portion 32 upwardly in contact against the flange on flanged bushing 90 which opposes the spring urging to limit the extent of the circular portion's upward movement away from the disc.

From this construction it will be noted that the flapper assemblies 18 and 20 will readily open in response to a forward flow through inlets 12 and 14 and assume respective positions corresponding to that shown in phantom in FIG. 3, with their abutments 68 and 70 in contact with the sides of extension 67. If a reverse flow should be produced through outlet duct 16 by the establishment of fluid communication between the outlet duct (not shown) and the high-pressure bleed (not shown) the flapper valve assemblies will be caused to pivot about pilot rod 26 until the outer peripheries of the valve discs 22 and 24 are slammed into seating engagement with valve seats 22a and 24a, thus blocking a reverse flow through the inlet ducts to the low-pressure bleeds (not shown) and occasioning a forward flow in the outlet duct. The arcs transversed by the flapper valve assemblies between the fully open and seated positions thereof are each substantially limited to less than 90° so that the impact velocities, and therefore impact damage, caused by the momentum of the assemblies is minimized.

I claim:

1. In a check valve, the combination comprising:

a housing having two converging inlet passages and an outlet passage in communication therewith, the axes of the passages generally defining a "Y";

a pair of annular valve seats formed within the housing at the respective ends of the inlet passages;

a mounting bracket positioned within the outlet passage intermediate the inlet passages and secured to the housing;

a rod positioned and received by the bracket, a pair of arms connected to the rod such that each arm is freely pivotable thereabout;

a pair of valve discs respectively secured to the arms for respective pivoting movement about the axis of the rod between seated and fully open positions, the valve discs sealingly engaging the valve seats in the seated positions thereof for checking a reverse flow through the outlet passage;

an extension integral with the bracket and projecting therefrom;

two integral abutments respectively formed on the arms, the extension and the abutments being in contact when the valve discs are in the fully open positions to limit further pivoting of the arms, the valve seats and the extension limiting the respective arcs traversed by the valve discs between seated and fully open positions to substantially less than 90°; and spring means to urge the respective arms away from the discs to provide for angular alignment freedom of the discs with respect to the seats.